(12) United States Patent
Tator et al.

(10) Patent No.: US 12,078,916 B2
(45) Date of Patent: Sep. 3, 2024

(54) TURNTABLE

(71) Applicant: Big Turntables, Longmont, CO (US)

(72) Inventors: Jonathan Tator, Encinitas, CA (US); Michael Lipka, Longmont, CO (US)

(73) Assignee: Big Turntables, Longmont, CO (US)

( * ) Notice: Subject to any disclaimer, the term of this patent is extended or adjusted under 35 U.S.C. 154(b) by 86 days.

(21) Appl. No.: 17/873,345

(22) Filed: Jul. 26, 2022

(65) Prior Publication Data

US 2023/0024932 A1 Jan. 26, 2023

Related U.S. Application Data

(60) Provisional application No. 63/225,823, filed on Jul. 26, 2021.

(51) Int. Cl.
*G03B 17/56* (2021.01)
*F16M 11/08* (2006.01)

(52) U.S. Cl.
CPC ........... *G03B 17/561* (2013.01); *F16M 11/08* (2013.01)

(58) Field of Classification Search
CPC ...... G03B 17/561; G03B 37/02; F16M 11/08; B60N 2/39
USPC .............................. 248/349.1, 346.5, 346.07
See application file for complete search history.

(56) References Cited

U.S. PATENT DOCUMENTS

| | | | | |
|---|---|---|---|---|
| 1,401,824 A * | 12/1921 | Smith | ...................... | A21B 1/44 248/349.1 |
| 1,819,656 A * | 8/1931 | Pressley | .................... | A63J 1/00 472/75 |
| 3,246,613 A * | 4/1966 | Johnston | ................. | A47B 11/00 108/20 |
| 5,167,586 A * | 12/1992 | Morris | .................... | A63H 13/20 472/6 |
| 6,148,568 A * | 11/2000 | Beasley | .................. | E04B 1/346 104/44 |
| 6,477,966 B1 * | 11/2002 | Petryna | .................. | A47B 37/04 108/151 |
| 6,609,773 B1 * | 8/2003 | Steadman | .............. | A47B 49/00 312/298 |
| 6,672,221 B2 * | 1/2004 | Hadley | ..................... | B64F 1/24 104/35 |
| 6,745,699 B2 * | 6/2004 | Hill | ......................... | B62D 65/18 104/35 |
| 6,877,437 B2 * | 4/2005 | Murdock | ................ | B60S 13/02 104/35 |
| 8,505,245 B2 * | 8/2013 | Bobryshev | ............... | G09B 5/08 434/350 |
| 9,412,203 B1 | 8/2016 | Garcia, III et al. | | |
| 10,407,032 B2 * | 9/2019 | Mondro | .................. | B60S 13/02 |
| 10,642,132 B1 | 5/2020 | Lai | | |

(Continued)

FOREIGN PATENT DOCUMENTS

EP 1387120 A1 * 2/2004 ............. F16M 11/06

*Primary Examiner* — Kimberly T Wood

(74) *Attorney, Agent, or Firm* — Casimir Jones, S.C.; Brian F. Bradley

(57) ABSTRACT

A turntable comprising a hub assembly including a first hub and a second hub rotatable with respect to the first hub about an axis, and an extension member releasably coupled to the second hub. The extension member rotates with the second hub about the axis when the extension member is coupled to the second hub. The extension member extends from the second hub radially outward from the axis.

25 Claims, 17 Drawing Sheets

(56) References Cited

U.S. PATENT DOCUMENTS

| | | |
|---|---|---|
| 10,839,557 B1 | 11/2020 | Arora et al. |
| 2001/0053284 A1 | 12/2001 | Shin |
| 2002/0105513 A1 | 8/2002 | Chen |
| 2003/0101894 A1* | 6/2003 | Schwenker .............. B60S 13/02 |
| | | 104/35 |
| 2004/0035314 A1* | 2/2004 | Muchalov .............. B62D 65/18 |
| | | 104/44 |
| 2004/0227751 A1 | 11/2004 | Anders |
| 2007/0278916 A1* | 12/2007 | Cermak ................. B65G 29/00 |
| | | 312/212 |
| 2009/0261210 A1* | 10/2009 | Moore, III ............... A63G 1/08 |
| | | 211/122 |
| 2012/0177350 A1 | 7/2012 | Jancourtz |
| 2013/0012949 A1* | 1/2013 | Fallin ................... A61B 17/151 |
| | | 606/87 |
| 2019/0011806 A1 | 1/2019 | Zilban et al. |
| 2019/0389685 A1* | 12/2019 | McGonagle ........... B65H 49/24 |
| 2020/0201165 A1 | 6/2020 | Lock |
| 2022/0182517 A1 | 6/2022 | Lai |

* cited by examiner

TURNTABLE

CROSS-REFERENCE TO RELATED APPLICATIONS

This application claims priority to U.S. Provisional Patent Application No. 63/225,823, filed on Jul. 26, 2021, the entire contents of which are incorporated herein by reference.

BACKGROUND

The ability to create 360-degree, rotational images aids in the consumer experience when shopping using online marketplaces. Creating 360-degree, rotational images requires digitally editing a set of images together.

The current solutions for obtaining the set of images required to digitally create a 360-degree image are tailored for small objects, which are rotated on small, motorized turntables. Cameras are positioned and synced with the motorized turntable to capture the necessary set of images. While the same solution works for obtaining the set of images for larger objects, to get the large object rotating requires expensive and heavy industrial motorized rotating stages, such as equipment used to display cars at auto shows.

These industrial stages require vast amounts of storage space, can weigh upwards of 1000 pounds, are labor intensive to setup, and are expensive to rent or purchase. Therefore, there is a need for a cheaper, easy-to-use way of rotating larger objects to obtain the set of images required to create digital 360-degree images.

SUMMARY

The disclosure provides, in one aspect, a turntable comprising a hub assembly, including a first hub and a second hub rotatable with respect to the first hub about an axis, and an extension member. The extension member releasably couples to the second hub, rotates with the second hub about the axis when the extension member is coupled to the second hub, and extends from the second hub radially outward from the axis.

In some embodiments, the second hub includes a plurality of protrusions, and the extension member includes an aperture to receive one of the plurality of protrusions.

In some embodiments, the plurality of protrusions is equally spaced around a circumference of the second hub.

In some embodiments, the second hub includes a center portion with a first thickness and a lip portion with a second thickness, smaller than the first thickness.

In some embodiments, the plurality of protrusions are positioned on the lip portion.

In some embodiments, the extension member is configured to couple to the second hub and decouple from the second hub without the use of tools.

In some embodiments, the extension member is one of a plurality of extension members releasably coupled to the second hub, wherein the plurality of extension members extend 360-degrees around the second hub.

In some embodiments, the extension member includes a recess, a magnet positioned within the recess, and a wheel assembly with a base magnetically coupled to the magnet and at least partially received within the recess.

In some embodiments, the extension member includes a first wheel at a first distance from the axis and a second wheel at a second distance from the axis, the second distance larger than the first distance.

In some embodiments, a top surface of the second hub and a top surface of the extension member are flush when the extension member is coupled to the second hub.

In some embodiments, the extension member includes a location indicium to provide visual indication of an initial position of the turntable.

In some embodiments, the extension member includes a plurality of notches formed in a radially outward edge.

In some embodiments, the turntable includes a location marker positioned within a groove formed in the extension member.

In some embodiments, a radially inward end of the extension member is coupled to an outer circumference of the second hub.

The disclosure provides, in another aspect, a turntable comprising a first hub including a plurality of indentations on a first side, a second hub including a plurality of wheels, a spacer positioned between the first hub and the second hub, and a bearing positioned between the first hub and the second hub. The second hub is rotatable with respect to the first hub about an axis and each of the plurality of wheels is at least partially received within one of the plurality of indentations.

In some embodiments, the plurality of indentations are equally spaced along a circumference of the first hub.

In some embodiments, the plurality of wheels are positioned on a first side of the second hub and a plurality of protrusions are formed on a second side of the second hub, opposite the first side.

In some embodiments, the turntable includes an extension member coupled to the second hub, wherein the extension member includes an aperture to receive one of the plurality of protrusions. In some embodiments, the extension member extends radially outward from the axis. In some embodiments, the extension member includes a recess formed in a first side, a magnet positioned within the recess, and a wheel assembly including a base magnetically coupled to the magnet and at least partially received within the recess.

In some embodiments, the second hub is configured to be manually rotated relative to the first hub.

In some embodiments, the second side of the first hub is positioned facing the second hub and the plurality of wheels are configured in contact with the second side of the first hub, wherein the second hub is configured to rotate continuously with respect to the first hub about the axis.

Other aspects of the disclosure will become apparent by consideration of the detailed description and accompanying drawings.

Before any embodiments are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present disclosure. All publications, patent applications, patents and other references mentioned herein are incorporated by reference in their entirety. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "an" and "the" include plural references unless the context clearly dictates otherwise. The present disclosure also contemplates other embodiments "comprising," "consisting of" and "consisting essentially of," the embodiments or elements presented herein, whether explicitly set forth or not.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

The term "coupled," as used herein, is defined as "connected," although not necessarily directly, and not necessarily mechanically. The term coupled is to be understood to mean physically, magnetically, chemically, fluidly, electrically, or otherwise coupled, connected or linked and does not exclude the presence of intermediate elements between the coupled elements absent specific contrary language.

Figure 1:
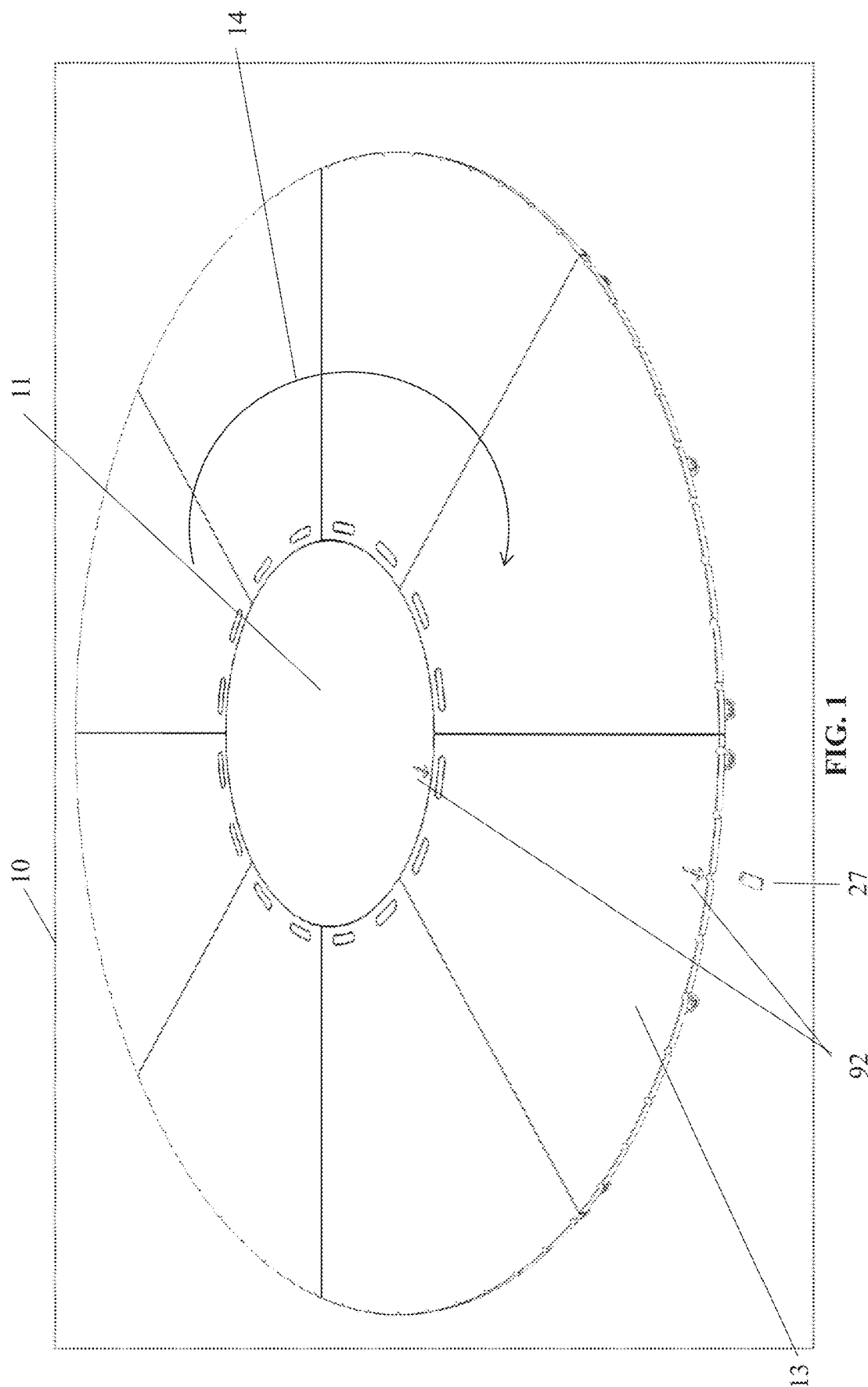
FIG. 1 is a top view of the hub assembly coupled with the plurality of extension members.

With reference to FIG. 1, a turntable 10 includes a hub assembly 11 and a plurality of extension members 14. In the illustrated embodiment, the plurality of extension members 14 extend 360-degrees around the hub assembly 11. In the illustrated embodiment, both the hub assembly 11 and an extension member 13 have a location indicium 92. A location marker 27, along with the location indicium 92 mark a starting position. In some embodiments, the location indicium 92 provides visual feedback to the position of the turntable 10.

Figure 2:
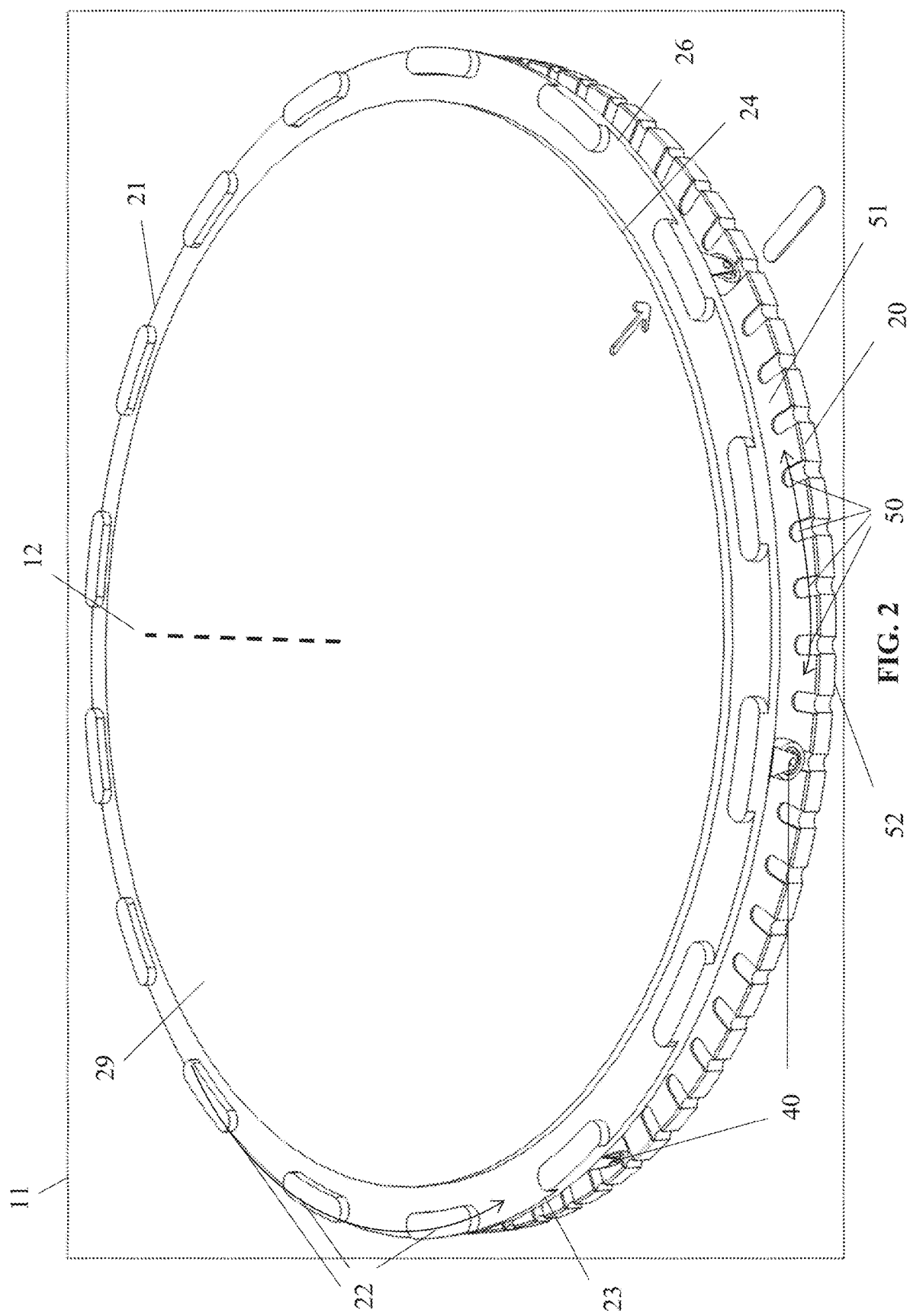
FIG. 2 is a top view of the hub assembly.

With reference to FIG. 2, the hub assembly 11 includes a first hub 20 and a second hub 21. The second hub 21 rotates with respect to the first hub 20 about an axis 12. In the illustrated embodiment, the second hub 21 contains a plurality of protrusions 22. The plurality of protrusions 22 are equally spaced around a circumference of the second hub 23.

Figure 3:
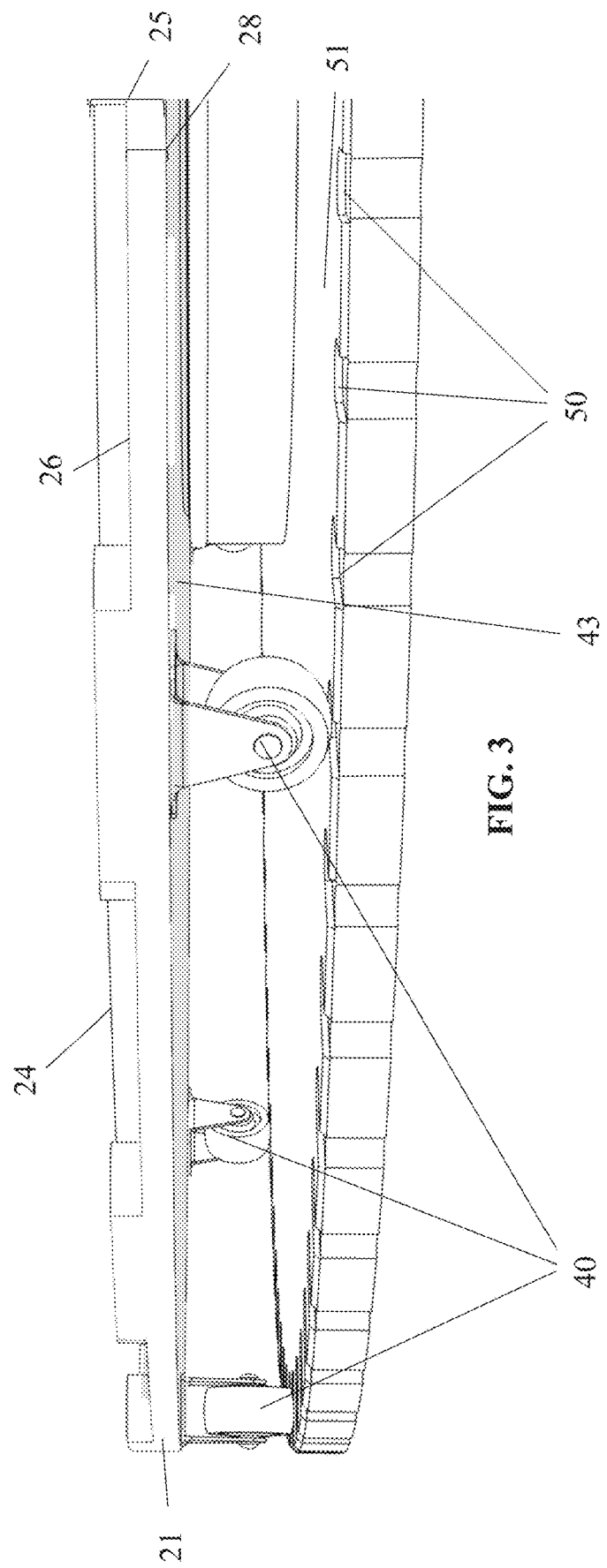
FIG. 3 is a side view of the hub assembly.

With reference to FIG. 2 and FIG. 3, the second hub 21 includes a center portion 24 and a lip portion 26. In the illustrated embodiment of FIG. 3, the center portion 24 has a first thickness 25 and the lip portion 26 has a second thickness 28. The second thickness 28 is smaller than the first thickness 25. In the illustrated embodiment of FIG. 2, the plurality of protrusions 22 are positioned on the lip portion 26. In some embodiments, the extension member 13 releasably couples to the second hub 21 using the plurality of protrusions 22.

With reference to FIG. 3, the second hub 21 includes a first side 43 with a plurality of wheels 40. With reference to FIG. 2, the second hub 21 includes a second side 29 with the plurality of protrusions 22.

Figure 9:
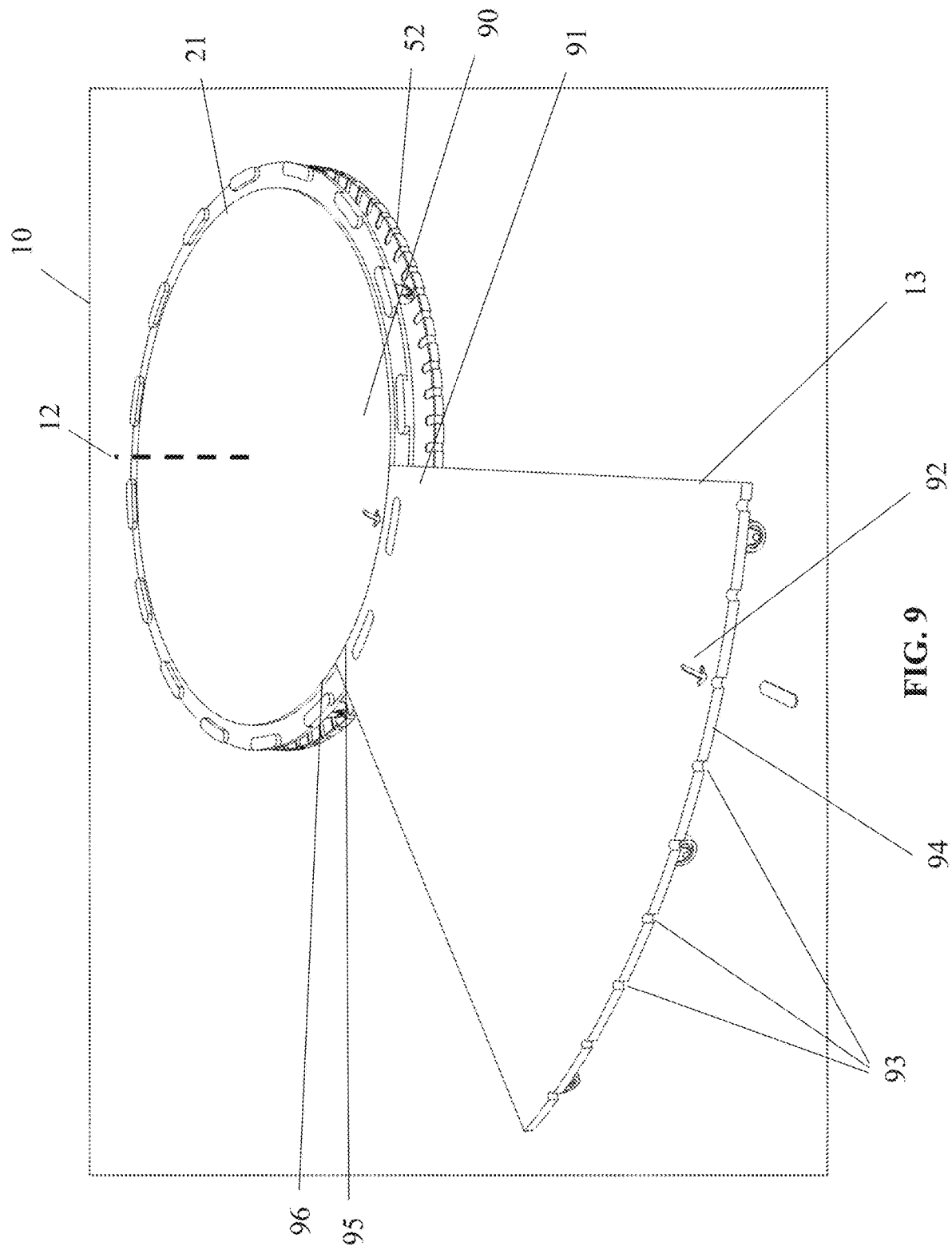
FIG. 9 is a top view of the hub assembly coupled with one extension member, illustrating the use of the location indicium and location marker.

With reference to FIG. 9, the extension member 13 is releasably coupled to the second hub 21. The extension member 13 extends radially outward from the second hub 21 from the axis 12. In the illustrated embodiment, the extension member 13 includes a radially inward end 95 which is coupled to an outer circumference of the second hub 96. In the illustrated embodiment, a top surface of the second hub 90 and a top surface of the extension member 91 are flush when the extension member 13 is coupled to the second hub 21.

With continued reference to FIG. 9, the extension member 13 is configured to rotate with the second hub 21 about the axis 12. In the illustrated embodiment, the extension member 13 includes a plurality of notches 93 formed in a radially outward edge of the extension member 94. In the illustrated embodiment, the extension member 13 includes the location indicium 92 to mark a location of the turntable 10. In some embodiments, the first hub 20 includes a plurality of notches 93 formed around a circumference of the first hub 52.

Figure 10:
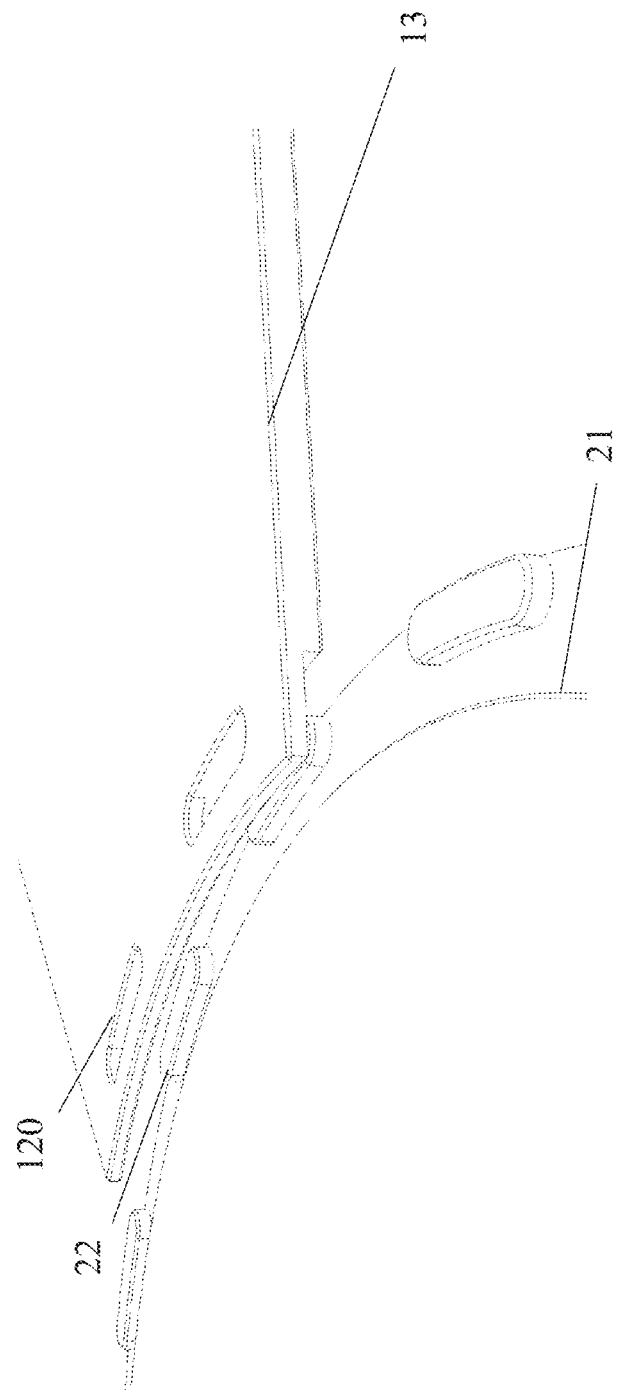
FIG. 10 illustrates the second hub being coupled with an extension member.
Figure 12A:
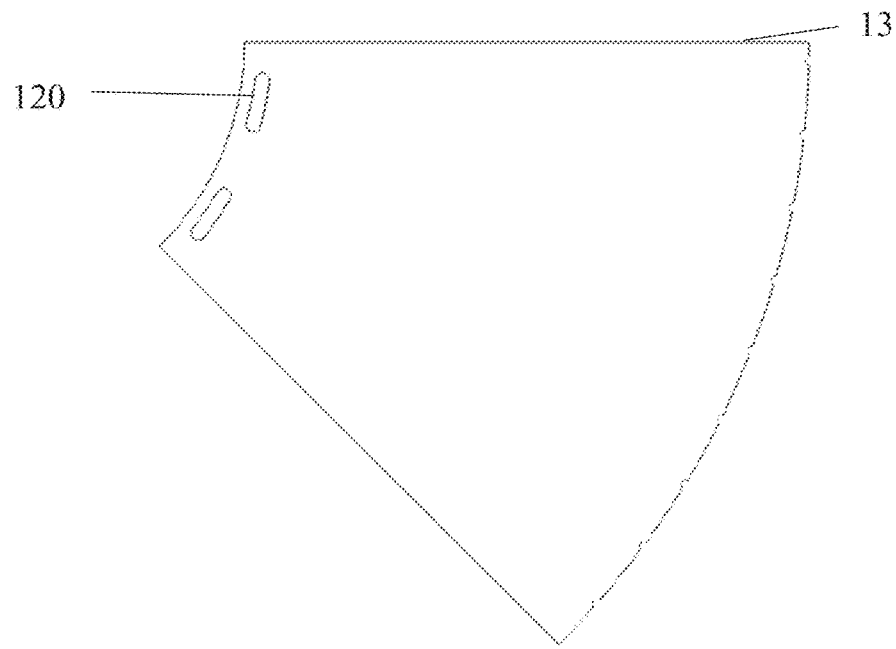
FIG. 12A is a top view of an extension member.

With reference to FIG. 10 and FIG. 12A, the extension member 13 includes an aperture 120. In the illustrated embodiment of FIG. 10, the aperture 120 is configured to couple to one of the plurality of protrusions 22 on the second hub 21. In some embodiments, the extension member 13 is configured to couple and decouple to the second hub 21 without the use of tools.

Figure 11:
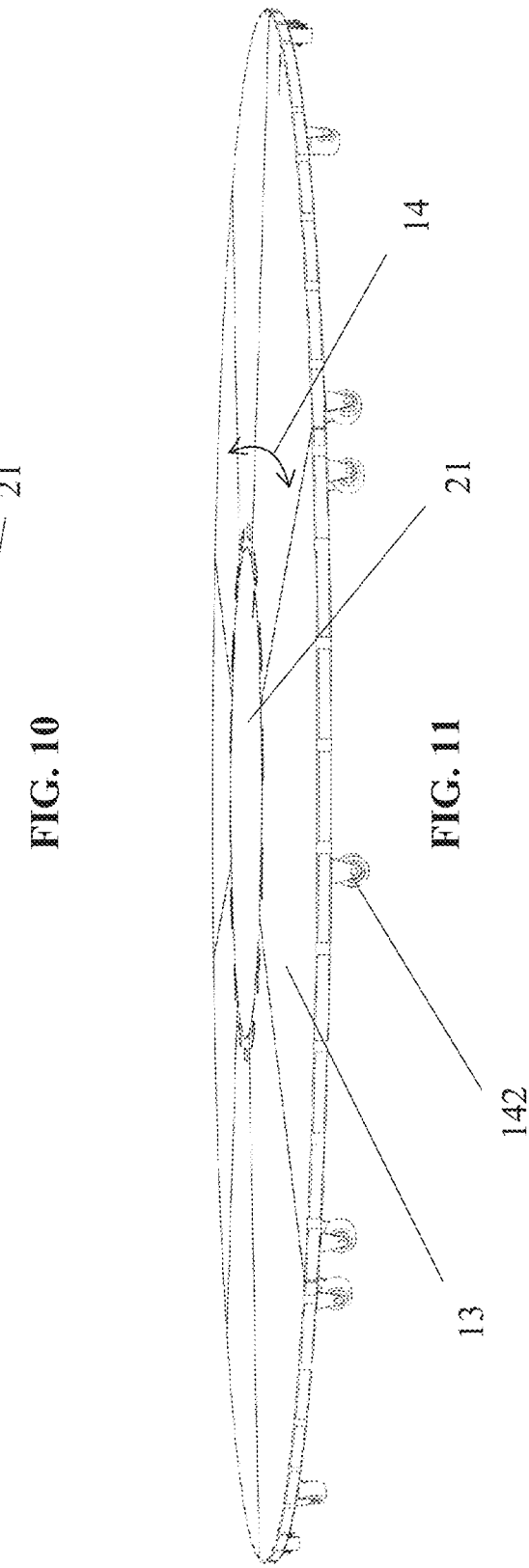
FIG. 11 is a side view of the hub assembly coupled with the plurality of extension members.

With reference to FIG. 11, the plurality of extension members 14 are coupled to the second hub 21, and the plurality of extension members 14 extend 360-degrees around the second hub 21. In some embodiments, the extension member 13 includes a wheel assembly 142. In some embodiments, the extension member 13 includes multiple wheel assemblies 142.

Figure 12B:
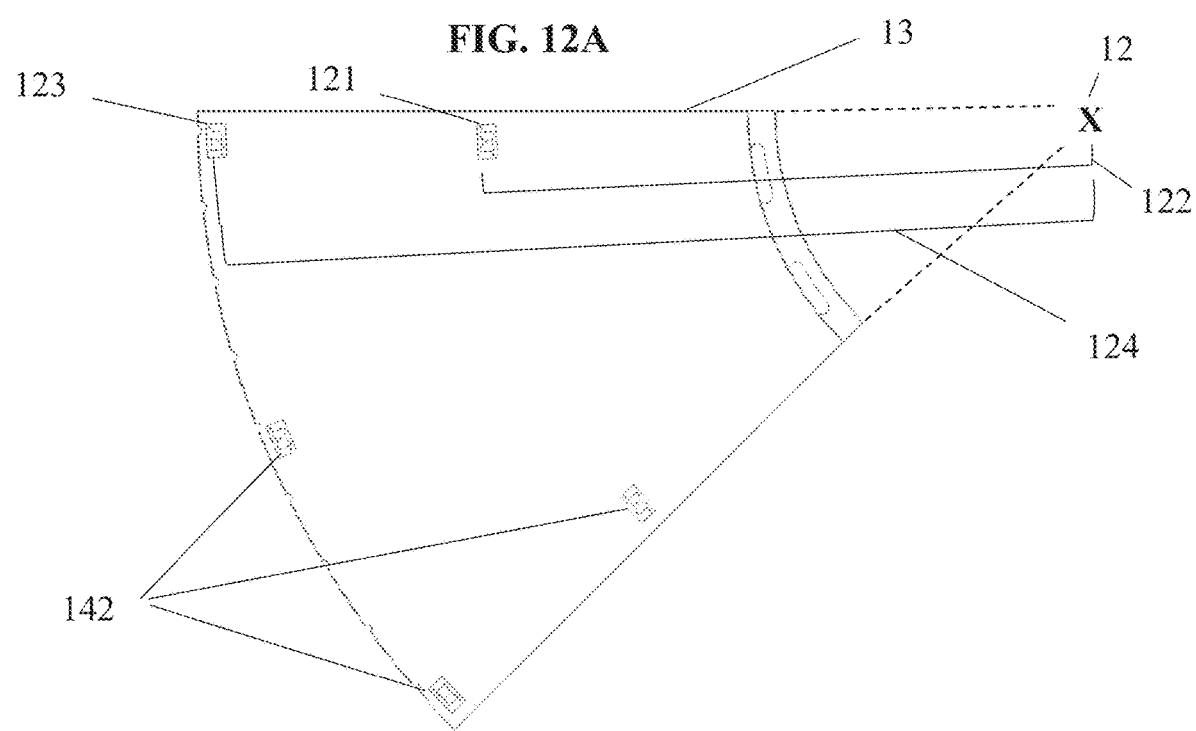
FIG. 12B is a bottom view of an extension member.

With reference to FIG. 12B, the extension member 13 includes multiple wheel assemblies 142. In the illustrated embodiment, the extension member 13 includes a first wheel assembly 121 at a first distance 122 from the axis 12, and a second wheel assembly 123 at a second distance 124 from the axis 12. The second distance 124 is larger than the first distance 123. In some embodiments, the extension member 13 contains two or more wheel assemblies 142. In some embodiments, the extension member 13 contains two or less wheel assemblies 142.

Figure 13A:
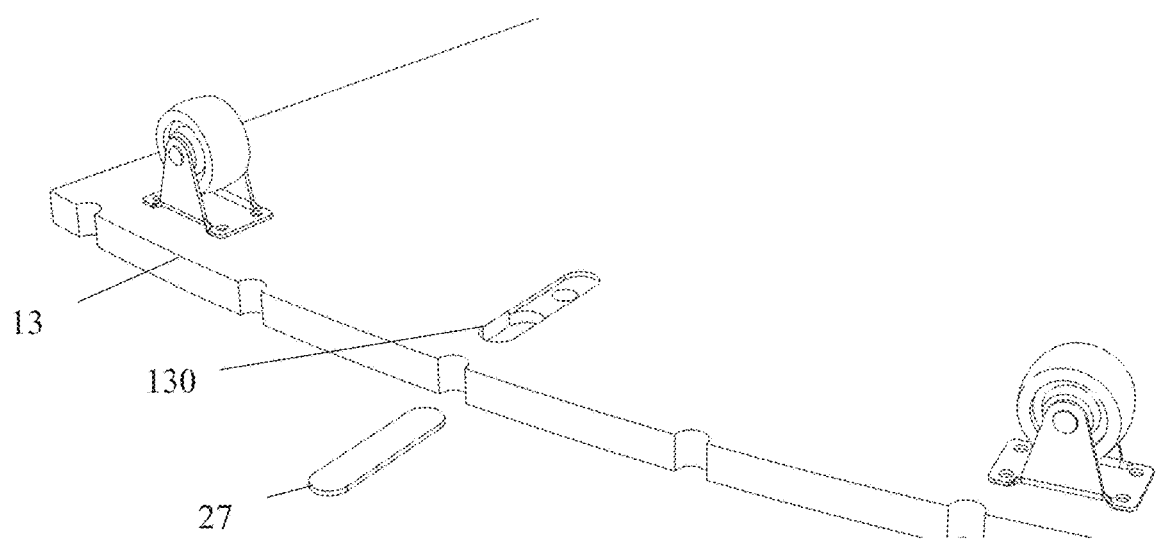
FIG. 13A illustrates use and the storage groove of the location marker.
Figure 13B:
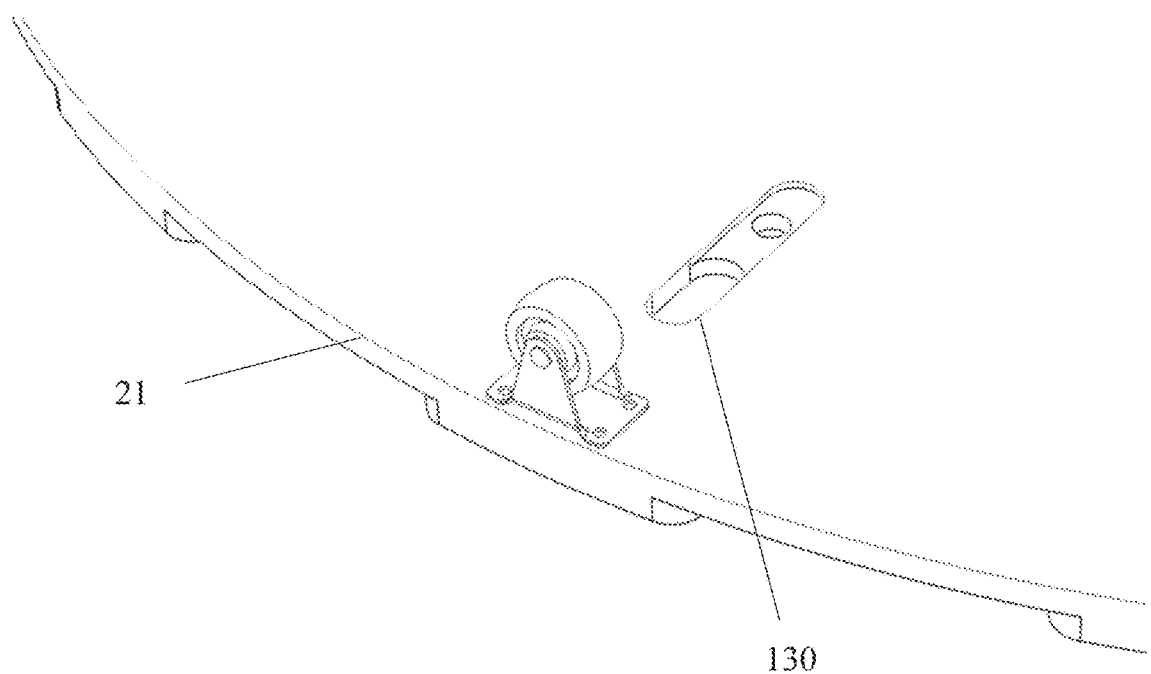
FIG. 13B illustrates storage of the location marker.

With reference to FIG. 13A, the extension member 13 includes a groove 130 for the location marker 27 to be stored. With reference to FIG. 13B, the second hub 21 includes a groove 130 for the location marker 27 to be stored.

Figure 14A:
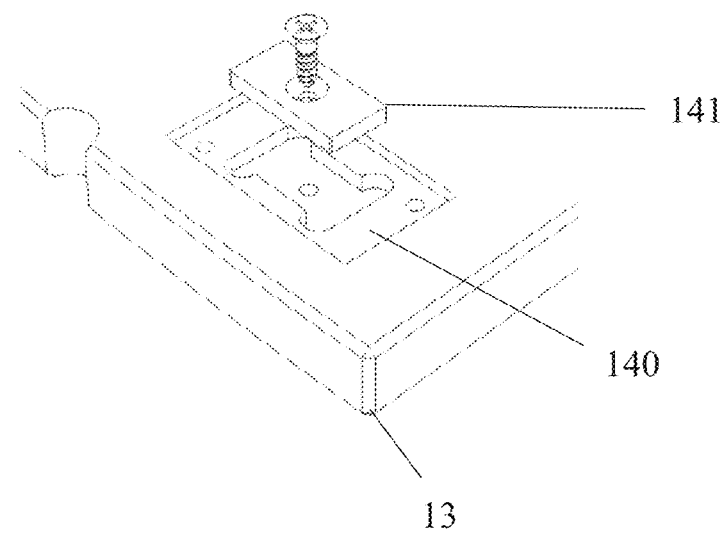
FIG. 14A illustrates the insertion of a magnet, positioned within a recess in an extension member.
Figure 14B:
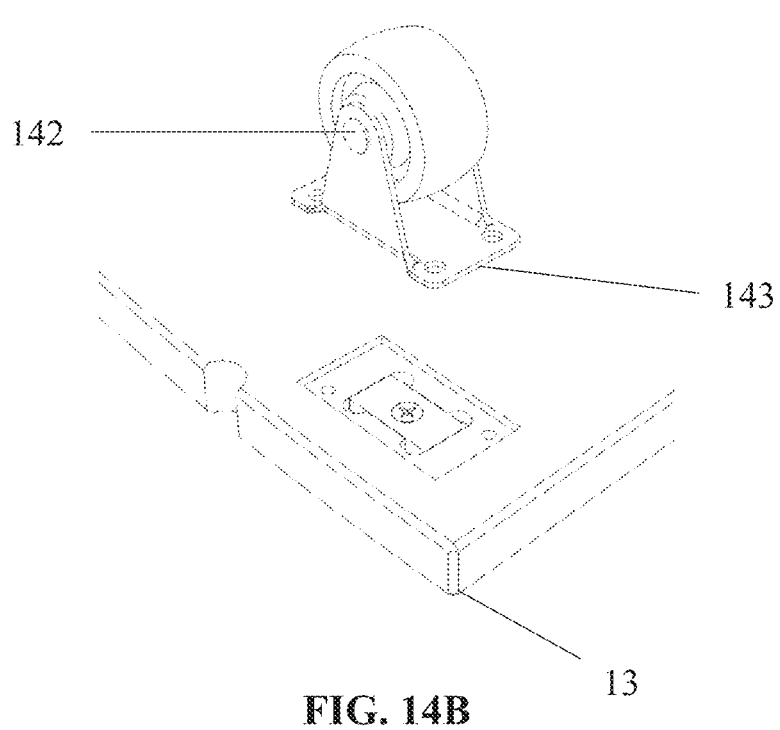
FIG. 14B illustrates the coupling of a wheel assembly and the magnet, positioned within a recess in an extension member.

With reference to FIG. 14A, the extension member 13 includes a recess 140. In the illustrated embodiment, a magnet 141 is positioned within the recess 140. With reference to FIG. 14B, the extension member 13 includes the wheel assembly 142. The wheel assembly 142 includes a base 143, which is magnetic.

Figure 14C:
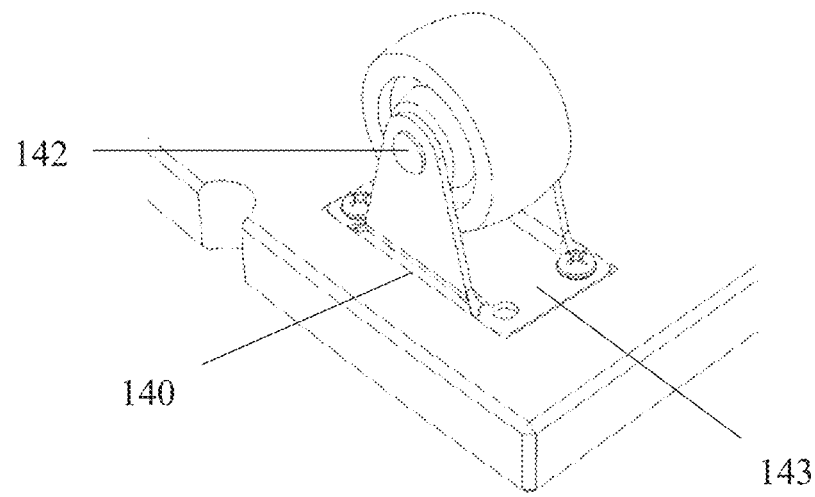
FIG. 14C illustrates an embodiment of the extension member where the wheel assembly is fastened into the recess.

With reference to FIG. 14C, the base 143 is magnetically coupled to the magnet 141, and at least partially received within the recess 140. In the illustrated embodiment, the wheel assembly 142 is configured to be at least partially inserted into the recess 140 without the use of tools. In the illustrated embodiment, magnetic force maintains the wheel assembly's 142 positioning at least partially in the recess 140. In some embodiments, the wheel assembly 142 is configured to attach into the recess 140 using fasteners or adhesives.

Figure 16:
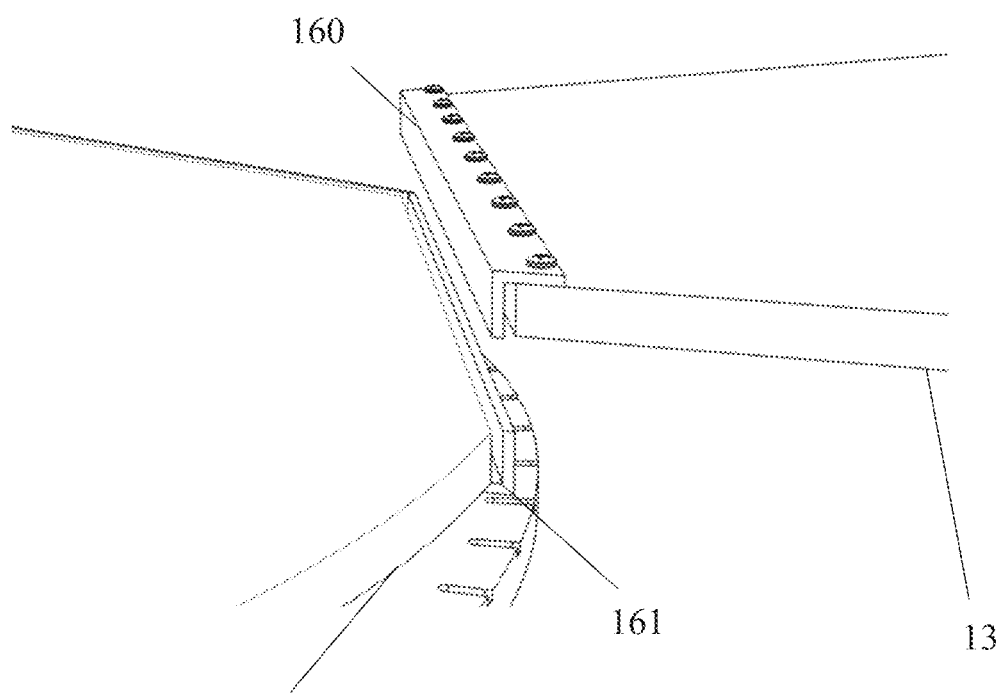
FIG. 16 illustrates an alternate coupling method between the hub assembly and an extension member.

With reference to FIG. 16, in some embodiments, an alternate coupling mechanism is used to couple the extension member 13 to the second hub 21. In the illustrated embodiment, the extension member 13 includes a first wedge 160. In the illustrated embodiment, the second hub 21 includes a second wedge 161. The first wedge 160 is configured to insert into the second wedge 161, coupling the extension member 13 to the second hub 21. In some embodiments, the first wedge 160 is configured to be inserted into the second wedge 161 without the use of tools.

In one configuration, during operation, the plurality of extension members 14 are coupled to the second hub 21. The second hub 21 is manually rotated with respect to the first hub 20 about the axis 12. The plurality of extension members 14 rotate with the second hub 21 during operation. The location marker 27 and the location indicium 92 provide feedback to the position of the turntable 10 during operation.

With reference to FIG. 2 and FIG. 3, the first hub 20 includes a first side 51 with a plurality of indentations 50. The plurality of indentations 50 on the first side 51 of the first hub 20 are equally spaced along the circumference of the first hub 52. In the illustrated embodiment of FIG. 3, the second hub 21 includes the first side 43 with a plurality of wheels 40.

In the illustrated embodiment of FIG. 2, the second hub 21 is configured to be manually rotated with respect to the first hub 20 about the axis 12, and each of the plurality of wheels 40 is at least partially received into one of the plurality of indentations 50.

Figure 4A:
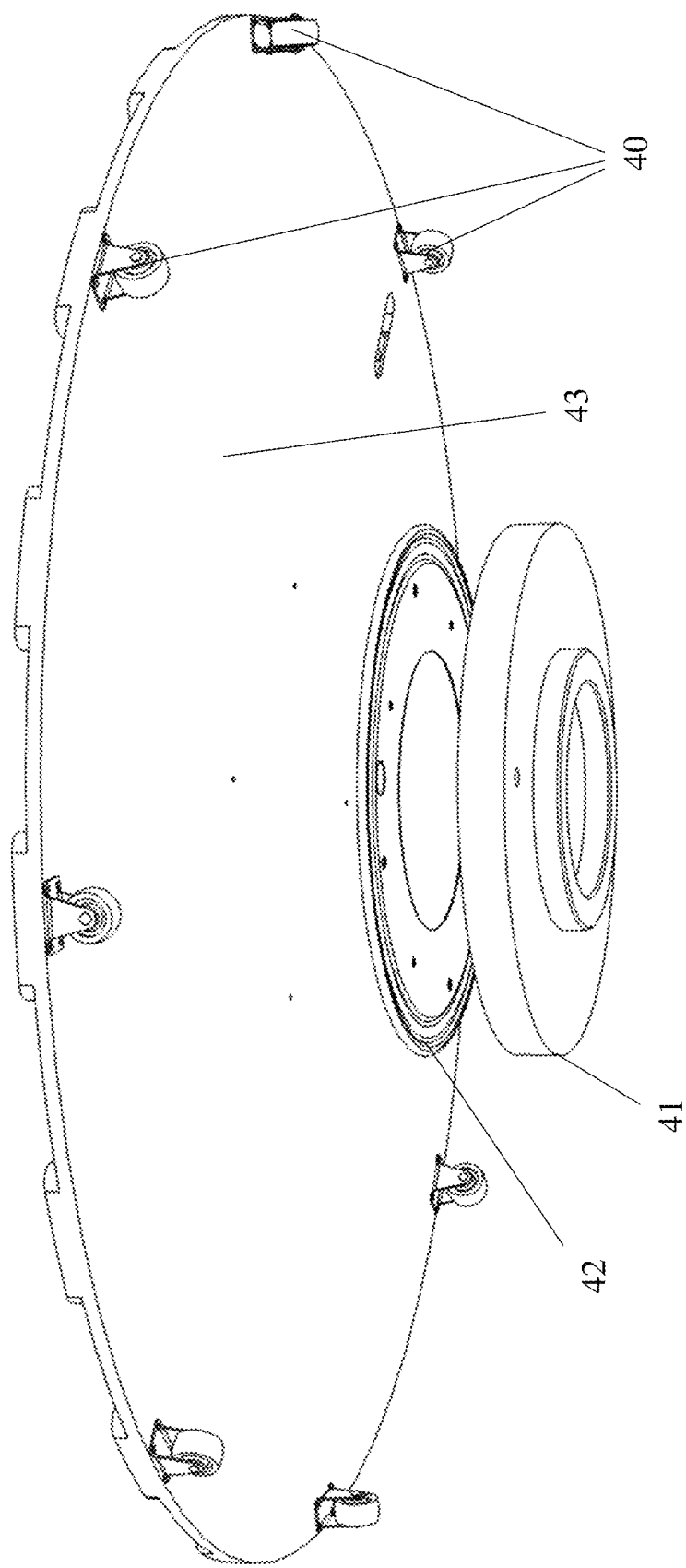
FIG. 4A is an exploded view of the second hub, spacer, and bearing.
Figure 4B:
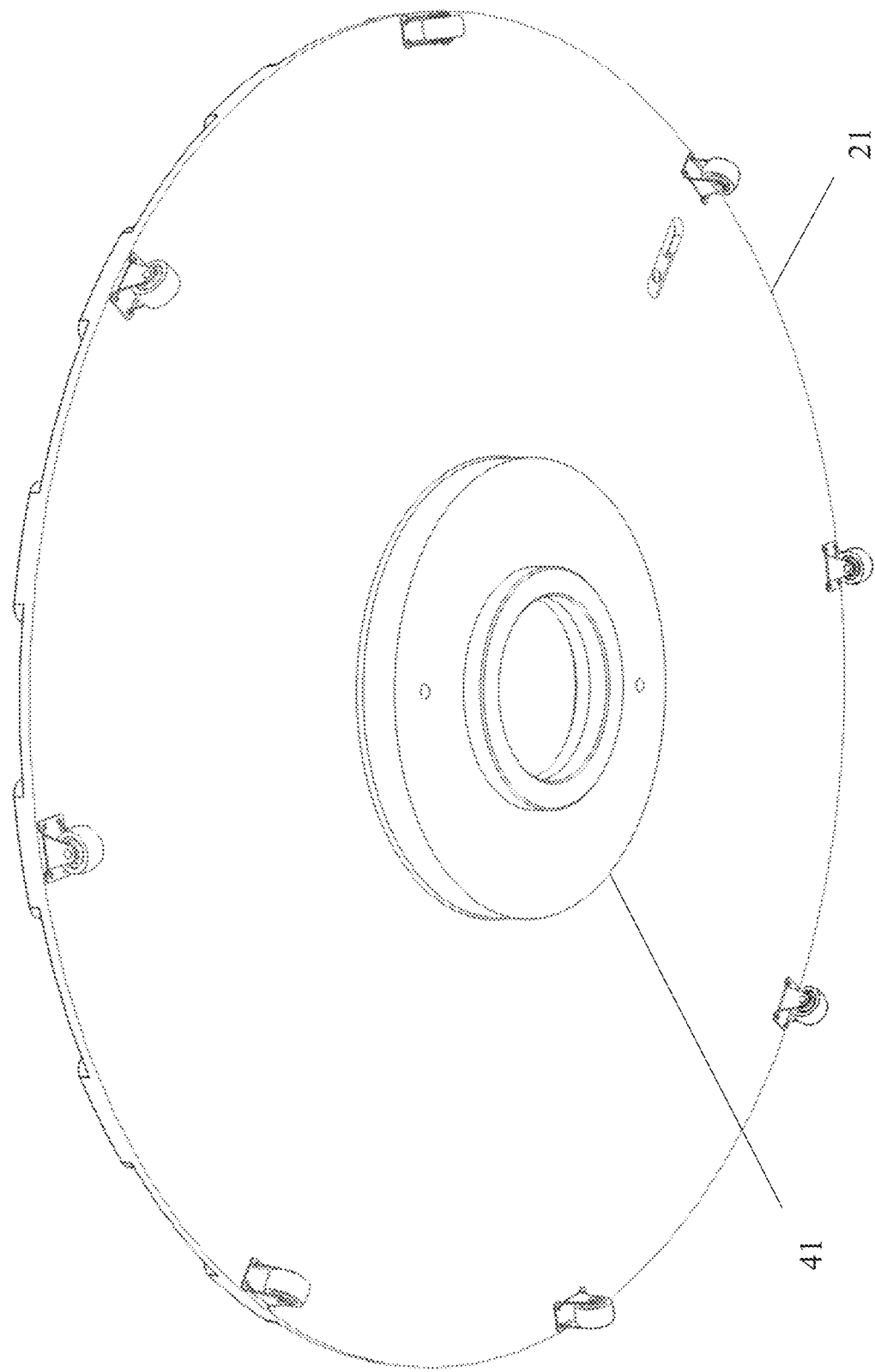
FIG. 4B is a bottom view of the second hub, spacer, and bearing.

With reference to both FIG. 4A and FIG. 4B, the plurality of wheels 40 on the first side 43 of the second hub 21 are positioned around the circumference of the second hub 23. In the illustrated embodiment of FIG. 4A, a spacer 41 and a bearing 42 are positioned on the first side 43 of the second hub 21. In some embodiments, the spacer 41 and bearing 42 are positioned between the first hub 20 and the second hub 21. In the illustrated embodiment of FIG. 4B, the spacer 41 and bearing 42 are fixed to the second hub 21.

Figure 5B:
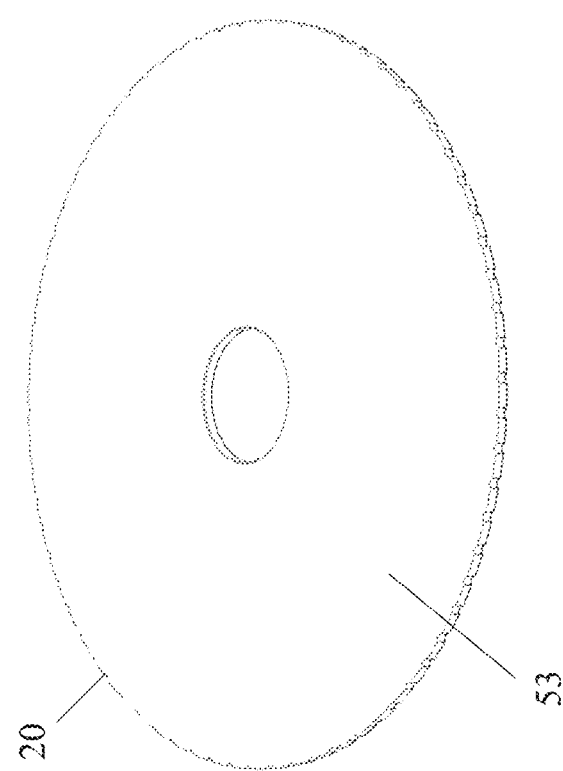
FIG. 5B is a top view of the first hub in a second configuration.
Figure 5A:
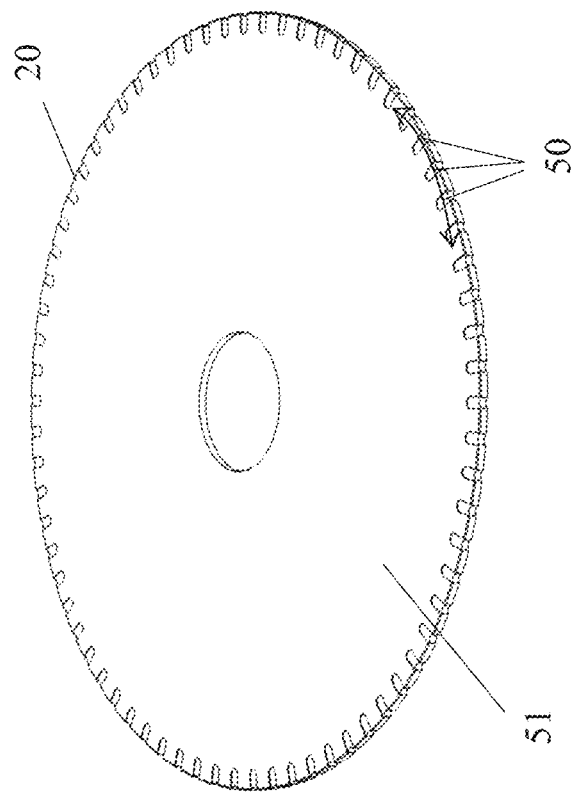
FIG. 5A is a top view of the first hub in a first configuration.

With reference to FIG. 5A and FIG. 5B, the first hub 20 is configured for use on either the first side 51 or the second side 53. In the illustrated embodiment of FIG. 5A, the first side 51 of the first hub 20 includes the plurality of indentations 50. In the illustrated embodiment of FIG. 5B, the second side 53 of the first hub 20 is a smooth surface.

Figure 6:
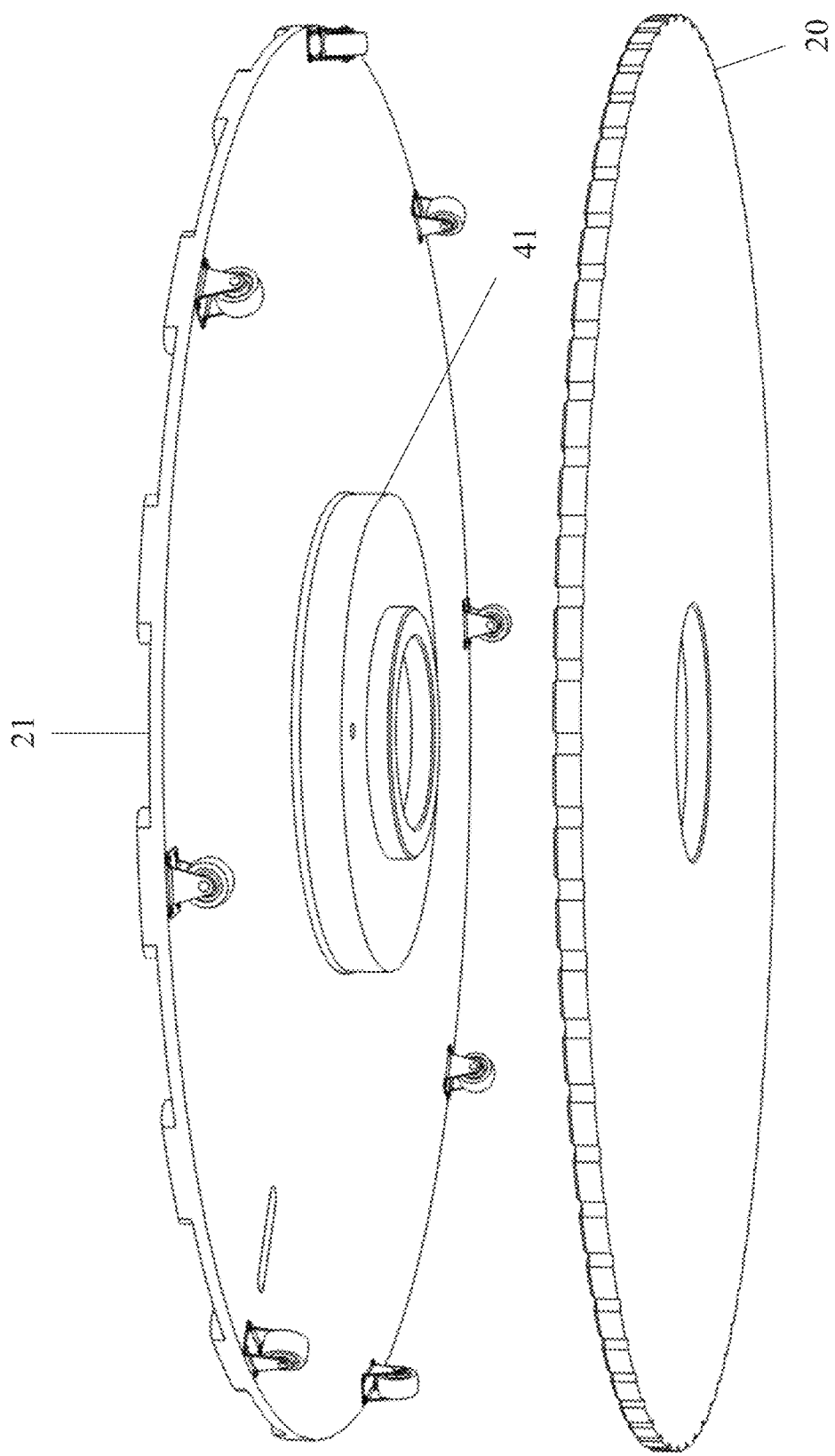
FIG. 6 is an exploded view of the first hub and the second hub.
Figure 7A:
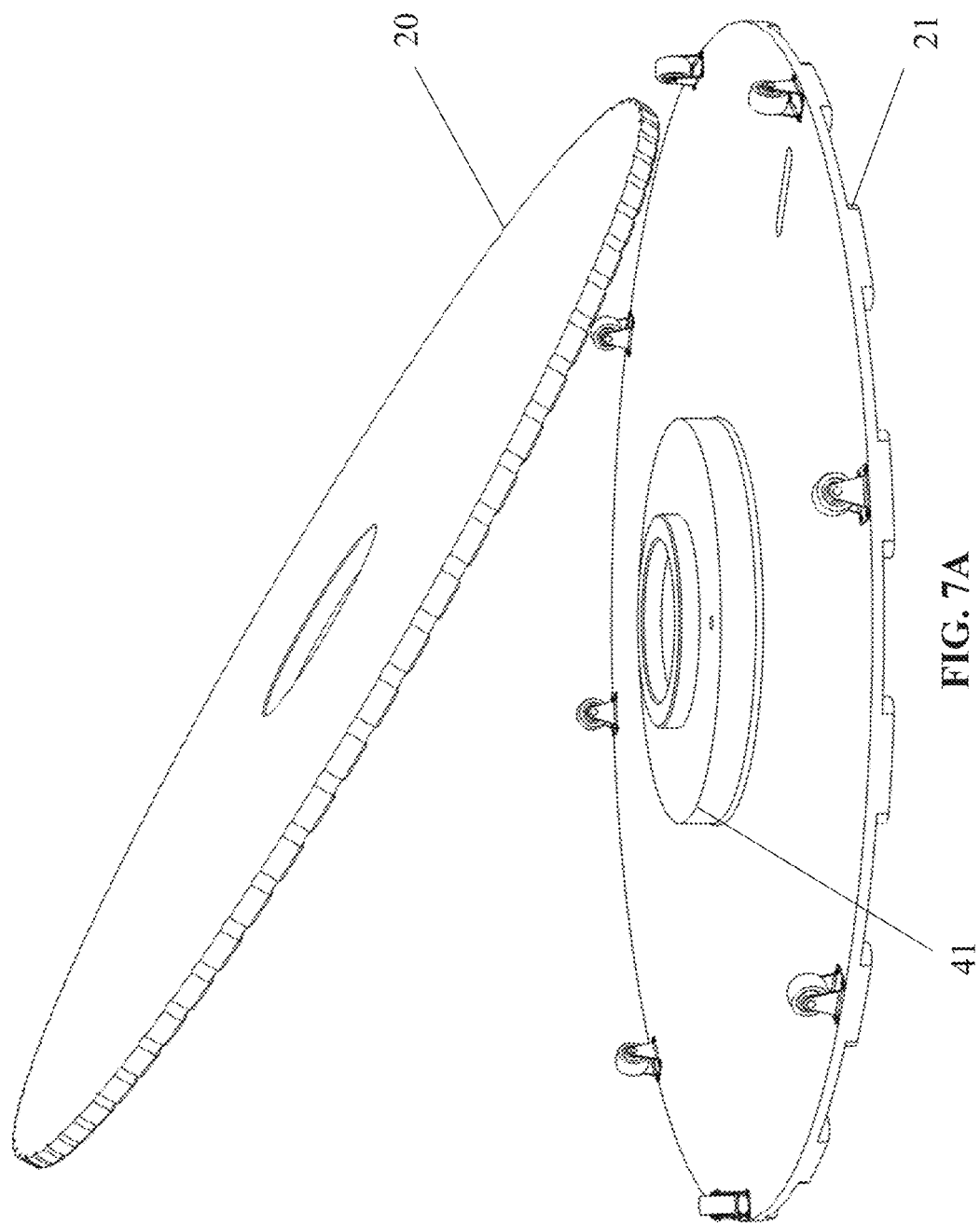
FIG. 7A illustrates the first hub being removable.

With reference to FIG. 6 and FIG. 7A, the first hub 20 is configured to be removed from the spacer 41. The first hub 20 is configured to be reattached to the spacer 41. In some embodiments, the first hub 20 is attached with the first side 51 facing the second hub 21. In some embodiments, the first hub 20 is attached with the second side 53 facing the second hub 21. In some embodiments, the first hub 20 is configured to be removed and reattached without the use of tools.

Figure 7B:
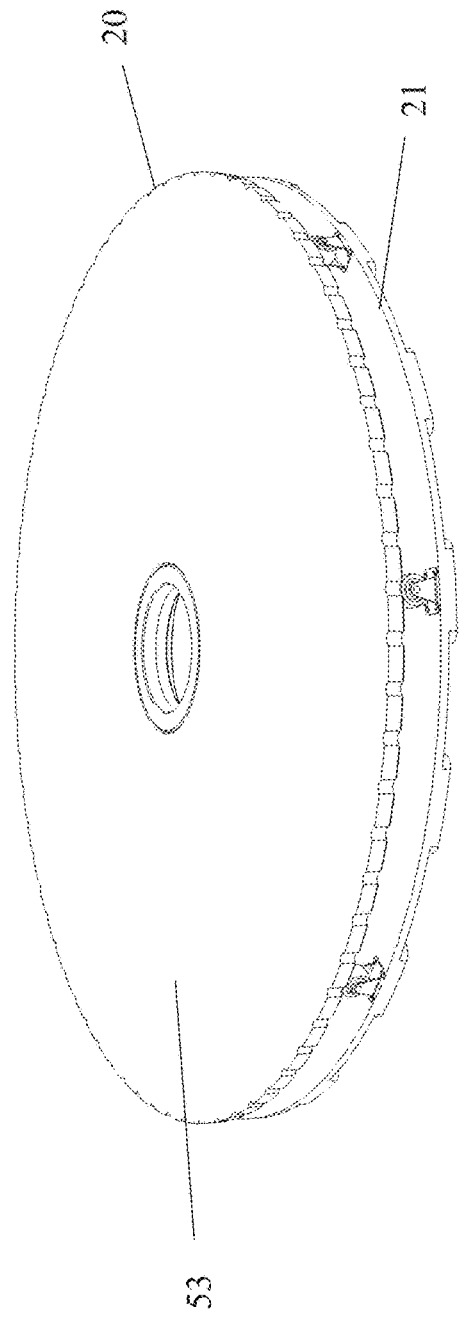
FIG. 7B is a bottom view of the hub assembly, illustrating the first hub in the first configuration and operable in an indented mode.
Figure 8A:
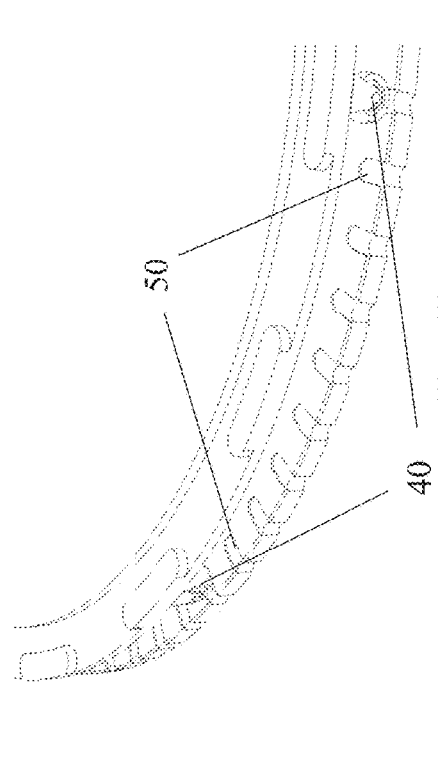
FIG. 8A is a top view of the hub assembly, illustrating the first hub in the first configuration and operable in an indented mode.
Figure 8B:
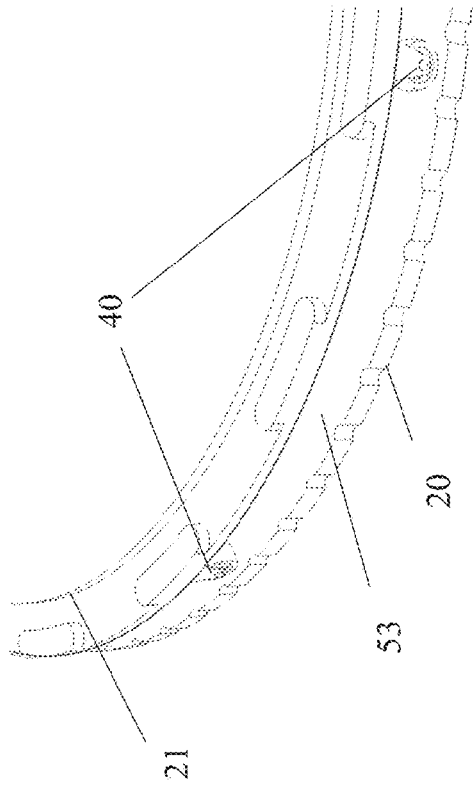
FIG. 8B is a zoomed-in view of FIG. 8A, highlighting the interaction of the plurality of wheels and the first hub when the first hub is in the first configuration and operable in an indented mode.

With reference to FIG. 7B, the first hub 20 is attached to the spacer 41 with the first side 51 facing the second hub 21. In the illustrated embodiments of FIG. 8A, the second hub 21 is configured to be manually rotated with respect to the first hub 20 about the axis 12. In the illustrated embodiment of FIG. 8B, each of the plurality of wheels 40 is at least partially received into one of the plurality of indentations 50.

Figure 7C:
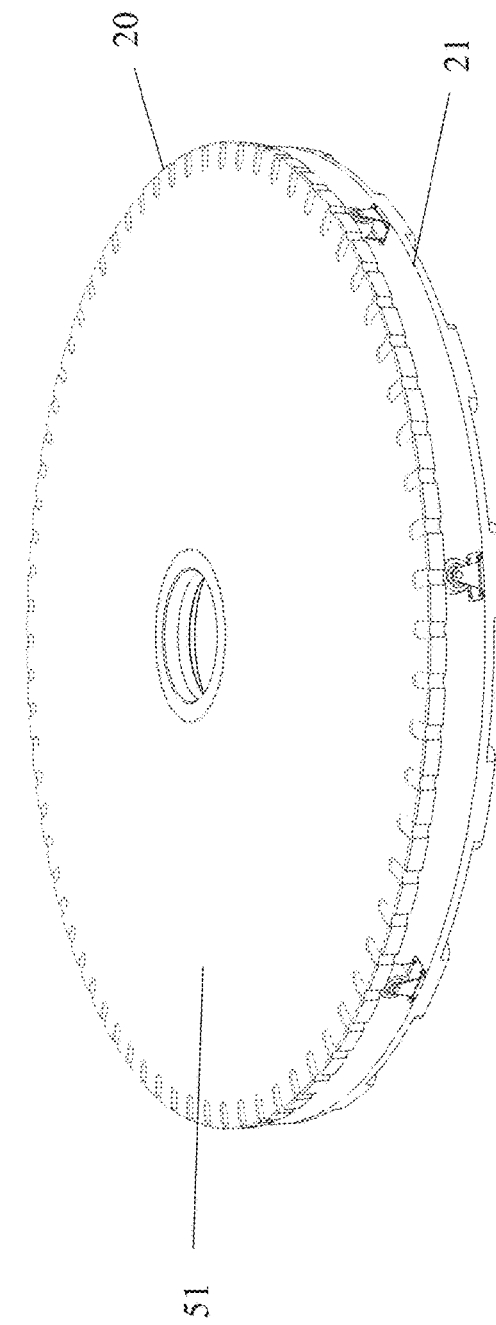
FIG. 7C is a bottom view of the hub assembly, illustrating the first hub in the second configuration and operable in a continuous mode.
Figure 8C:
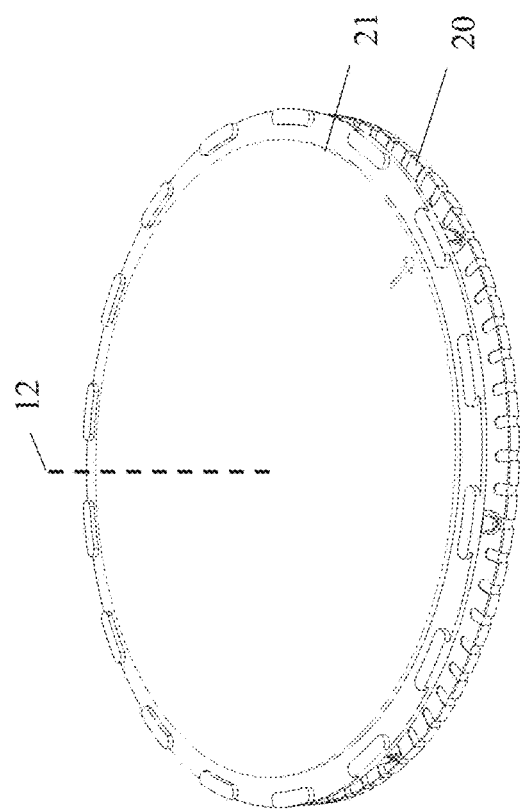
FIG. 8C is a top view of the hub assembly, illustrating the first hub in the second configuration and operable in a continuous mode.
Figure 8D:
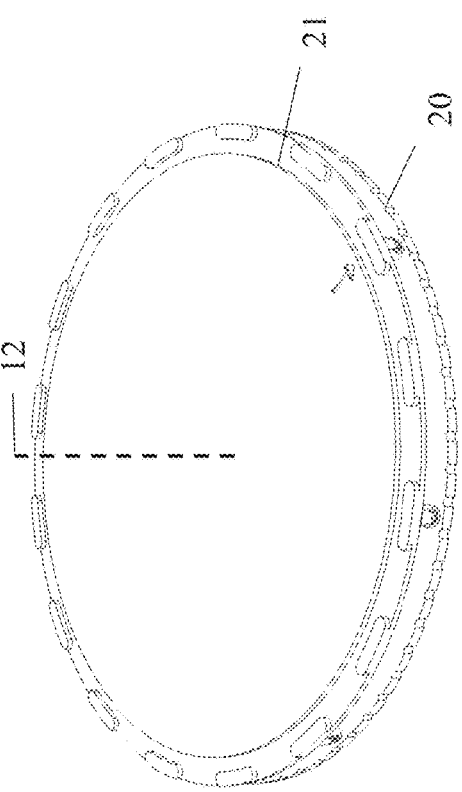
FIG. 8D is a zoomed-in view of FIG. 8C, highlighting the interaction of the plurality of wheels and the first hub in the second configuration and operable in a continuous mode.

With reference to FIG. 7C, the first hub 20 is attached to the spacer 41 with the second side 53 facing the second hub 21. In the illustrated embodiments of FIG. 8C, the second hub 21 is configured to be manually rotated continuously with respect to the first hub 20 about the axis 12. In the illustrated embodiment of FIG. 8D, the plurality of wheels 40 are positioned in contact with the second side 53 of the first hub 20. The second side 53 of the first hub 20 provides a smooth surface for continuous rotation of the second hub 21.

Figure 15:
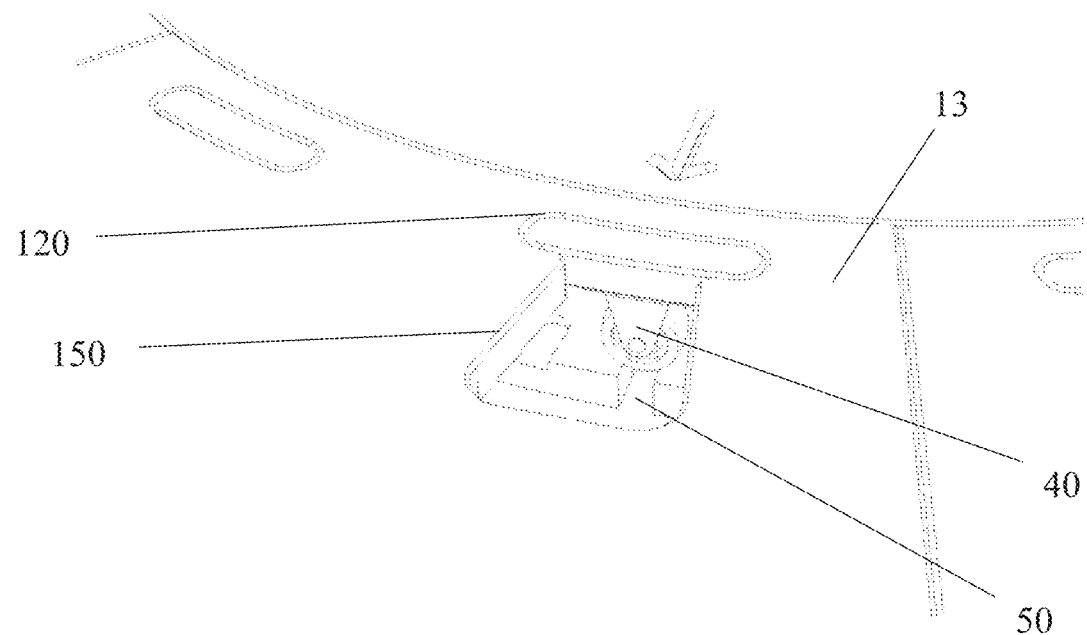
FIG. 15 is a top view of the hub assembly coupled with an extension member having a cutout for visual confirmation of the interaction between a wheel and an indentation.

With reference to FIG. 15, in some embodiments, the extension member 13 includes a cutout 150. The cutout 150 extends the aperture 120. In other words, the cutout 150 is connected to at least part of the aperture 120. In the illustrated embodiment, the cutout 150 provides visual feedback for one of the plurality of wheels 40 being at least partially received into one of the plurality of indentations 50. In some embodiments, the cutout 150 provides visual feedback for one of the plurality of wheels 40.

In one configuration, during operation, the second hub 21 is manually rotated with respect to the first hub 20 about the axis 12. The plurality of wheels 40 interact with the plurality of indentations 50 to stop the rotation of the second hub 21 until the second hub 21 is manually rotated again. The location marker 27 and the location indicium 92 provide feedback to the position of the turntable 10 during operation.

In another configuration, during operation, the second hub 21 is manually rotated with respect to the first hub 20 about the axis 12. The second side 53 of the first hub 20 provides a smooth surface for continuous rotation of the second hub 21. The plurality of wheels 40 are positioned in contact with the smooth surface of the second side 53 of the second hub 21. The location marker 27 and the location indicium 92 provide feedback to the position of the turntable 10 during operation.

Various features and advantages are set forth in the following claims.

What is claimed is:

1. A turntable comprising:
   a hub assembly including a first hub and a second hub rotatable with respect to the first hub about an axis,
   an extension member releasably coupled to the second hub; wherein the extension member rotates with the second hub about the axis when the extension member is coupled to the second hub; and
   wherein the extension member extends from the second hub radially outward from the axis; and wherein the extension member and the first hub includes a plurality of notches formed in a radially outward edge.

2. The turntable of claim 1, wherein the second hub includes a plurality of protrusions, and the extension member includes an aperture to receive one of the plurality of protrusions.

3. The turntable of claim 2, wherein the plurality of protrusions is equally spaced around a circumference of the second hub; wherein the second hub includes a center portion with a first thickness and a lip portion with a second thickness, smaller than the first thickness; and wherein the plurality of protrusions are positioned on the lip portion.

4. The turntable of claim 1, wherein the extension member is configured to couple to the second hub and decouple from the second hub without the use of tools.

5. The turntable of claim 1, wherein the extension member is one of a plurality of extension members releasably coupled to the second hub, wherein the plurality of extension members extend 360 degrees around the second hub.

6. The turntable of claim 1, wherein the extension member includes a recess, a magnet positioned within the recess, and a wheel assembly with a base magnetically coupled to the magnet and at least partially received within the recess.

7. The turntable of claim 1, wherein the extension member includes a first wheel assembly at a first distance from the axis and a second wheel assembly at a second distance from the axis, the second distance larger than the first distance.

8. The turntable of claim 1, wherein a top surface of the second hub and a top surface of the extension member are flush when the extension member is coupled to the second hub.

9. The turntable of claim 1, wherein the extension member and the second hub include a location indicium to provide visual indication of an initial position of the turntable.

10. The turntable of claim 1, further including a location marker positioned within a groove formed in the extension member and in the second hub.

11. The turntable of claim 1, wherein a radially inward end of the extension member is coupled to an outer circumference of the second hub.

12. A turntable comprising:
    a first hub including a first side with a plurality of indentations and a second side with a smooth surface;
    a second hub including a plurality of wheels;
    a spacer positioned between the first hub and the second hub, configured for the first hub to releasably couple to the second hub;
    a bearing positioned between the first hub and the second hub;
    wherein the second hub is rotatable with respect to the first hub about an axis, and wherein each of the plurality of wheels is at least partially received within one of the plurality of indentations on the first side of the first hub.

13. The turntable of claim 12, wherein the plurality of indentations are equally spaced along a circumference of the first side of the first hub.

14. The turntable of claim 12, wherein the plurality of wheels are positioned on a first side of the second hub, and wherein a plurality of protrusions are formed on a second side of the second hub, opposite the first side.

15. The turntable of claim 14, further including an extension member coupled to the second hub; the extension member includes an aperture to receive one of the plurality of protrusions; wherein the extension member extends radially outward from the axis;
    wherein the extension member includes a recess formed in a first side and a magnet positioned within the recess; and
    a wheel assembly including a base magnetically coupled to the magnet and at least partially received within the recess.

16. The turntable of claim 12, wherein the second hub is configured to be manually rotated relative to the first hub.

17. The turntable of claim 12, wherein the second side of the first hub is positioned facing the second hub and the plurality of wheels are configured in contact with the second side of the first hub, wherein the second hub is configured to rotate continuously with respect to the first hub about the axis.

18. A turntable comprising:
    a hub assembly including a first hub and a second hub rotatable with respect to the first hub about an axis,
    an extension member releasably coupled to the second hub; wherein the extension member rotates with the second hub about the axis when the extension member is coupled to the second hub; and
    wherein the extension member extends from the second hub radially outward from the axis; and
    wherein the extension member includes a recess, a magnet positioned within the recess, and a wheel assembly with a base magnetically coupled to the magnet and at least partially received within the recess.

19. The turntable of claim 18, wherein the first wheel assembly is at a first distance from the axis and the extension member further includes a second wheel assembly at a second distance from the axis, the second distance larger than the first distance.

20. The turntable of claim 18, wherein the second hub includes a plurality of protrusions, and the extension member includes an aperture to receive one of the plurality of protrusions.

21. The turntable of claim 18, wherein the extension member is one of a plurality of extension members releasably coupled to the second hub, wherein the plurality of extension members extend 360 degrees around the second hub.

22. The turntable of claim 18, wherein a top surface of the second hub and a top surface of the extension member are flush when the extension member is coupled to the second hub.

23. The turntable of claim 18, wherein the extension member and the first hub includes a plurality of notches formed in a radially outward edge.

24. The turntable of claim 18, wherein the extension member and the second hub include a location indicium to provide visual indication of an initial position of the turntable.

25. The turntable of claim 18, further including a location marker positioned within a groove formed in the extension member and in the second hub.

* * * * *